United States Patent
Reiger et al.

(10) Patent No.: US 7,177,650 B1
(45) Date of Patent: Feb. 13, 2007

(54) METHOD AND APPARATUS FOR USE IN REDUCING OVERUTILIZATION OF RF COMMUNICATION SYSTEM RESOURCES

(75) Inventors: Ronald Reiger, Redmond, WA (US); Matthew Katinsky, Seattle, WA (US)

(73) Assignee: Clearwire Corporation, Kirkland, WA (US)

( * ) Notice: Subject to any disclaimer, the term of this patent is extended or adjusted under 35 U.S.C. 154(b) by 0 days.

(21) Appl. No.: 09/609,021

(22) Filed: Jun. 30, 2000

Related U.S. Application Data (60) Provisional application No. 60/147,298, filed on Aug. 4, 1999.

(51) Int. Cl.
*H04Q 7/20* (2006.01)

(52) U.S. Cl. ............... 455/453; 455/405; 455/450; 455/452.1; 455/451

(58) Field of Classification Search ............... 455/452, 455/446, 450, 453, 437, 458, 405, 452.1, 455/451; 370/331, 209
See application file for complete search history.

(56) References Cited

U.S. PATENT DOCUMENTS

| | | | |
|---|---|---|---|
| 5,293,640 A * | 3/1994 | Gunmar et al. ............. 455/446 |
| 5,504,937 A * | 4/1996 | Kangas ........................ 455/453 |
| 5,561,839 A | 10/1996 | Österberg et al. ........... 455/33.1 |
| 5,603,085 A | 2/1997 | Shedlo ...................... 455/33.1 |
| 5,668,562 A | 9/1997 | Cutrer et al. ................ 343/703 |
| 5,710,758 A | 1/1998 | Soliman et al. ............. 370/241 |
| 5,787,350 A | 7/1998 | van der Vorm et al. ..... 455/446 |
| 5,912,884 A * | 6/1999 | Park et al. .................. 370/331 |
| 5,926,762 A | 7/1999 | Arpee et al. ................. 455/447 |
| 5,966,662 A * | 10/1999 | Murto ......................... 455/458 |
| 6,128,500 A * | 10/2000 | Raghavan et al. .......... 455/453 |
| 6,223,041 B1 * | 4/2001 | Egner et al. ................ 455/452 |

* cited by examiner

*Primary Examiner*—Joseph Feild
*Assistant Examiner*—David Q. Nguyen
(74) *Attorney, Agent, or Firm*—Michael J. Donohue; Davis Wright Tremaine LLP (57) ABSTRACT

A method of allocating resources in a network is disclosed. The method includes accessing data from a fixed wireless loop network having a plurality of stations that are each associated with a plurality of remote units. Each plurality of remote units is assigned to receive communication service from an associated station. The method also includes comparing communication service load data associated with one or more stations to a communications load criteria to identify a potentially overloaded station; and reducing the number of remote units assigned to receive communication service from the potentially overloaded station.

42 Claims, 10 Drawing Sheets

METHOD AND APPARATUS FOR USE IN REDUCING OVERUTILIZATION OF RF COMMUNICATION SYSTEM RESOURCES

RELATED APPLICATION

This application claims the benefit of U.S. Provisional Application No. 60/147,298; filed Aug. 4, 1999 and entitled "Method and Apparatus for Use in Reducing Overutilization of RF Communication System Resources" which is incorporated herein in its entirety.

BACKGROUND

1. Field of the Invention

The invention relates generally to fixed wireless loop networks having stations which each provide wireless communication service to a plurality of remote units. In particular, the invention relates to efficiently assigning each remote unit to a particular station.

2. Background of the Invention

Wireless local loop technology is becoming an increasingly popular technology for providing communication service such as telephony, television programming, etc. A fixed wireless loop network includes a plurality of stations. Each station communicates through airlinks with a plurality of remote units that are positioned near the location of the end user. The end user generally receives the communication service directly from the remote unit.

Stations are often positioned so any of several stations could provide communication service to a single remote unit. However, for effective allocation of system resources, a single station must be selected to provide the communication service to a remote unit. Because several variables can affect which station is the best station for providing the communication service to a particular remote unit, remote units are often inefficiently assigned to stations. An inefficient assignment of remote units can overload stations and cause the quality of communication service to decrease. As a result, there is a need for a method of efficiently allocating remote units within a fixed wireless loop network.

SUMMARY OF THE INVENTION

The invention relates to a method of allocating resources in a network either in design or operation of the network. The method includes accessing data from a fixed wireless loop network or a design of a fixed wireless loop network having a plurality of stations which are each associated with a plurality of remote units. Each plurality of remote units is assigned to receive communication service from the associated station. The method also includes comparing communication service load data associated with one or more stations to communications load criteria to identify potentially overloaded stations; and reducing the number of remote units assigned to receive communication service from the potentially overloaded stations.

In one embodiment of the method, the number of remote units receiving communication service from the potentially overloaded station is reduced by identifying re-assignable remote units. A re-assignable remote unit is a remote unit which is receiving communication service from the potentially overloaded remote unit but can receive communication service from a substitute station. The re-assignable remote unit is compared to re-assignment criteria to determine whether the remote unit can be re-assigned. Remote units which can be re-assigned to the substitute station are re-assigned.

Another embodiment of the invention includes creation of a corrected service area plot. The corrected service area plot is a service area plot which accounts for remote units which have been re-assigned from the station to the substitute station.

The invention also relates to a signal bearing medium including machine readable instructions executable by a processing apparatus to perform methods according to the present invention.

DETAILED DESCRIPTION OF THE PREFERRED EMBODIMENT

The invention relates to a method of allocating resources in a network which includes a plurality of stations which are each associated with a plurality of remote units. Each plurality of remote units is assigned to receive communication service from the associated station. The remote units receiving communication service from a station place a communication service load on the station. As a result, each station is associated with communication service load data.

The communication service load data associated with one or more stations can be compared to a communication service load criteria to identify whether the station is a potentially overloaded stations. The number of remote units assigned to receive communication service from a potentially overloaded stations can be reduced in order to reduce the communication service load upon the potentially overloaded station. The method can be repeated until the potentially overloaded station is no longer classified as a potentially overloaded station.

The number of remote units assigned to receive communication services from a potentially overloaded station can be reduced by re-assigning remote units which are to receive the communication service from the potentially overloaded station to other stations. Before re-assigning a remote unit to receive communication service from another station, the other station can be tested for its ability to provide communication services to additional remote units without becoming potentially overloaded. As a result, the methods of the present invention efficiently allocate the resources of a fixed wireless loop network by reducing the opportunities for stations to become overloaded.

The methods can be applied to an existing fixed wireless loop network in order to balance out the communication service loads placed on existing stations. The application of these methods can be very important when remote units are being added to an existing network. The method can be used to assign the additional remote units to receive communication services from a particular station and/or to re-assign existing remote units to receive the communication service from a different station to make room for the additional remote units.

The methods can also be used for design of a future network. For instance, the method can be applied to a hypothetical network which represents a possible future network. The communication service load data for each station can be based on future projections. As a result, a network can be designed with an efficient allocation of resources.

Figure 1:
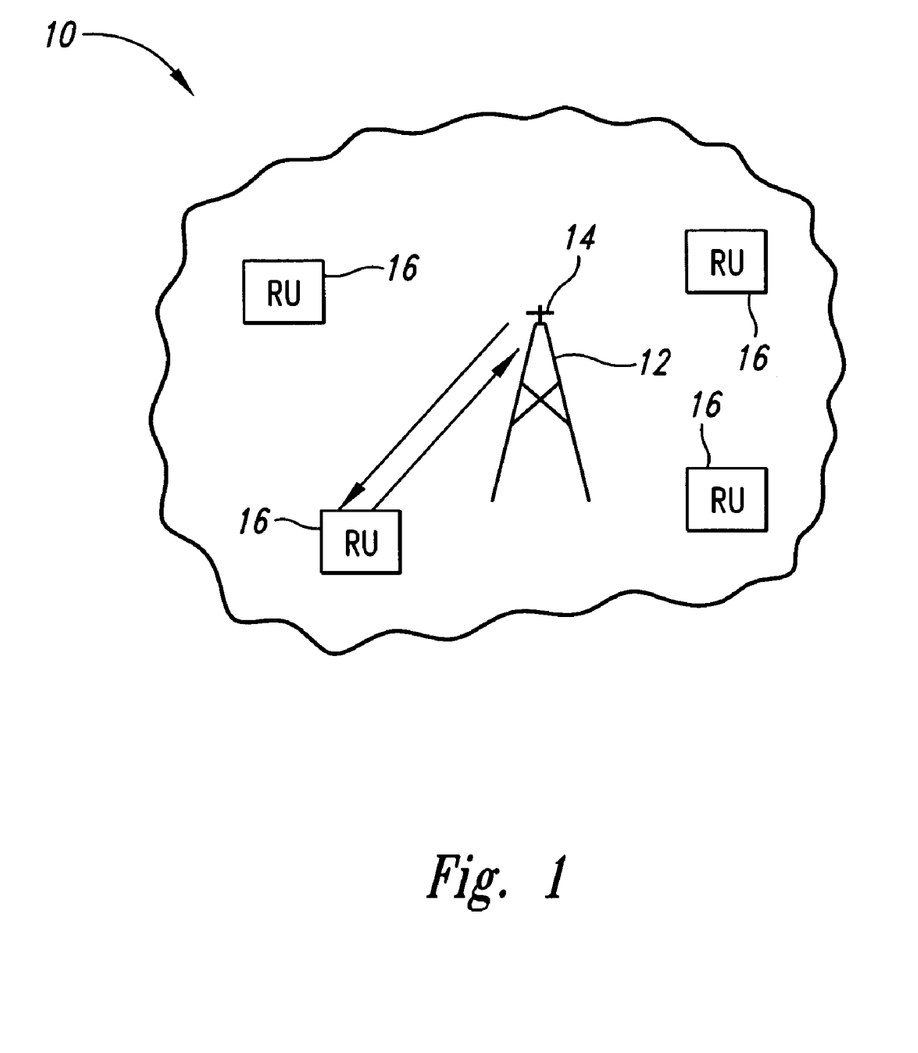
FIG. 1 illustrates a portion of a fixed wireless loop network.

FIG. 1 illustrates a portion of a fixed wireless loop network 10 including a single station 12. The station 12 includes an antenna 14. The antenna can be any mechanism for transmitting and/or receiving electromagnetic waves and can be directional or omnidirectional. A plurality of remote units 16 are positioned within the service area 19 of the antenna 14. One or two directional wireless communication is established between the remote units 16 and the station 12.

Figure 2:
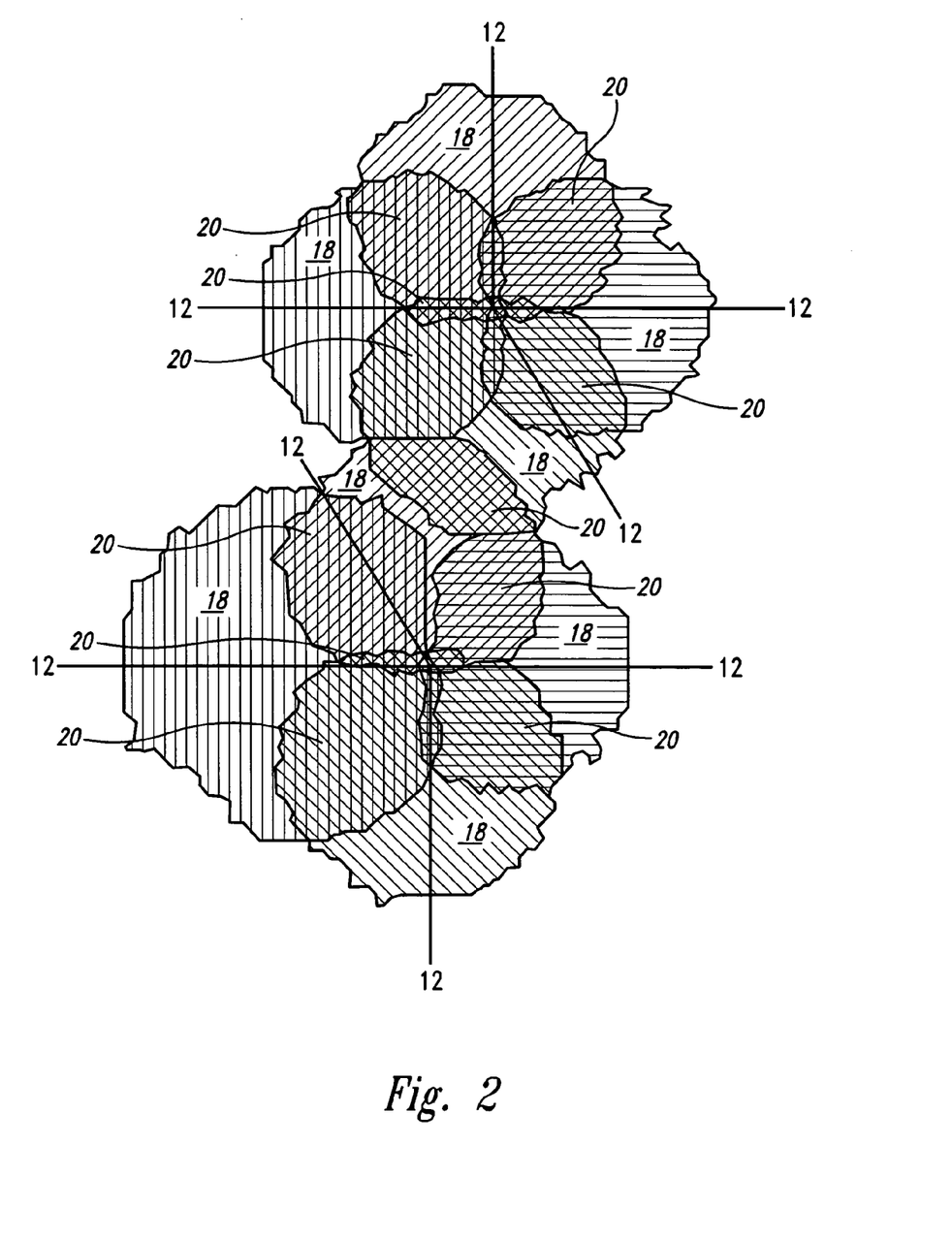
FIG. 2 illustrates potential service areas for eight different stations.

FIG. 2 illustrates a plurality of stations 12. Each station 12 is associated with a potential service area 18. The potential service area 18 for a station 12 is the largest area to which the station 12 could satisfactorily provide communication service. As will become apparent below, the actual service area can be the same as the potential service area 18 but is often smaller. Overlap regions labeled 20 indicate where service areas 18 overlap. Since one or more remote units 16 can be positioned within an overlap region, more than one station 12 can provide communication service to the remote unit 16. However, for effective allocation of each station's resources, a single station 12 must be selected to provide the communication service to each remote unit 16. As a result, each remote unit 16 is assigned to receive communication service from a particular station 12.

Figure 3:
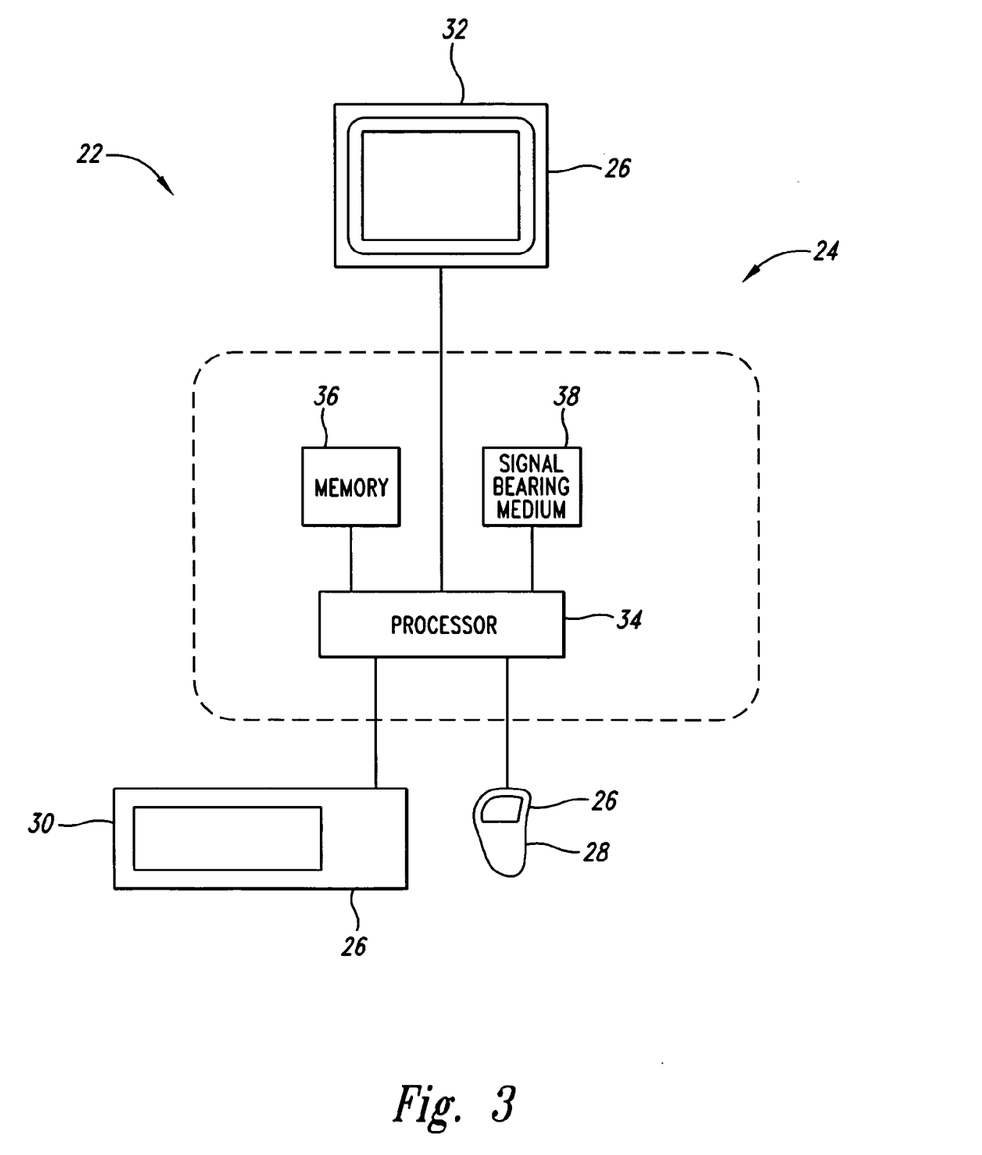
FIG. 3 illustrates a system for allocating resources in a fixed wireless loop network.

FIG. 3 illustrates a system 22 for allocating resources in a fixed wireless loop network 10. The system includes a processing unit 24 in communication with user interfaces 26 such as a mouse 28, keyboard 30 and a monitor 32. A suitable processing unit 24 includes, but is not limited to, PCs and workstations. The processing unit 24 includes a processor 34, one or more memories 36 and a signal bearing medium 38 including machine readable instructions executable by the microprocessor. The processor 34 is preferably a microprocessor. The memory 36 can be any memory 36 device or combination of memory 36 devices suitable for read/write operations such as storing images and data developed during execution of code. Suitable signal bearing media include, but are not limited to optical discs such as a compact disk (CD), CD-ROM, CD-R (a recordable CD-ROM that can be read on a CD-ROM drive), CD-RW (multiple-write CD), CD-E (recordable and erasable CD), or DVD (digital video disc). Alternatively, instead of, or in addition to an optical disc, the signal bearing medium 38 may include one or more of the following: a magnetic data storage diskette (floppy disk), a Zip disk, DASD storage (e.g., a conventional "hard drive" or a RAID array), magnetic tape, RAM, electronic read-only memory 36 (e.g., ROM, EPROM, or EEPROM), paper punch cards, or transmission media such as digital and/or analog communication links.

In some instances, the signal bearing medium 38 is positioned outside or remote from the processing unit 24. For instance, the signal bearing medium 38 may be part of, or may be connected to, a server computer that is connected to a computer network, in order to make the machine-readable code available to other computers. The network may be a local area network (LAN), a wide area network (WAN), or any other type of network. This arrangement enables one or more other computers connected to the network to copy the machine-readable code from the signal bearing medium 38 that is part of, or connected to, the (server) computer, to a signal bearing medium 38 that is part of, or connected to, the computer that is downloading the code. This may be accomplished, for example, by connecting computers from one or more networks, over the Internet.

In other instances, the signal bearing medium 38 may be part of, or may be connected to, a computer that is operating a bulletin board system (BBS), which can be accessed by other computers. This arrangement enables one or more computers to connect to the BBS, and copy the machine-readable code from the signal bearing medium 38 that is part of, or connected to, the computer that is operating the BBS, to a signal bearing medium 38 that is part of, or connected to, a computer that is downloading the machine-readable code.

Figure 4:
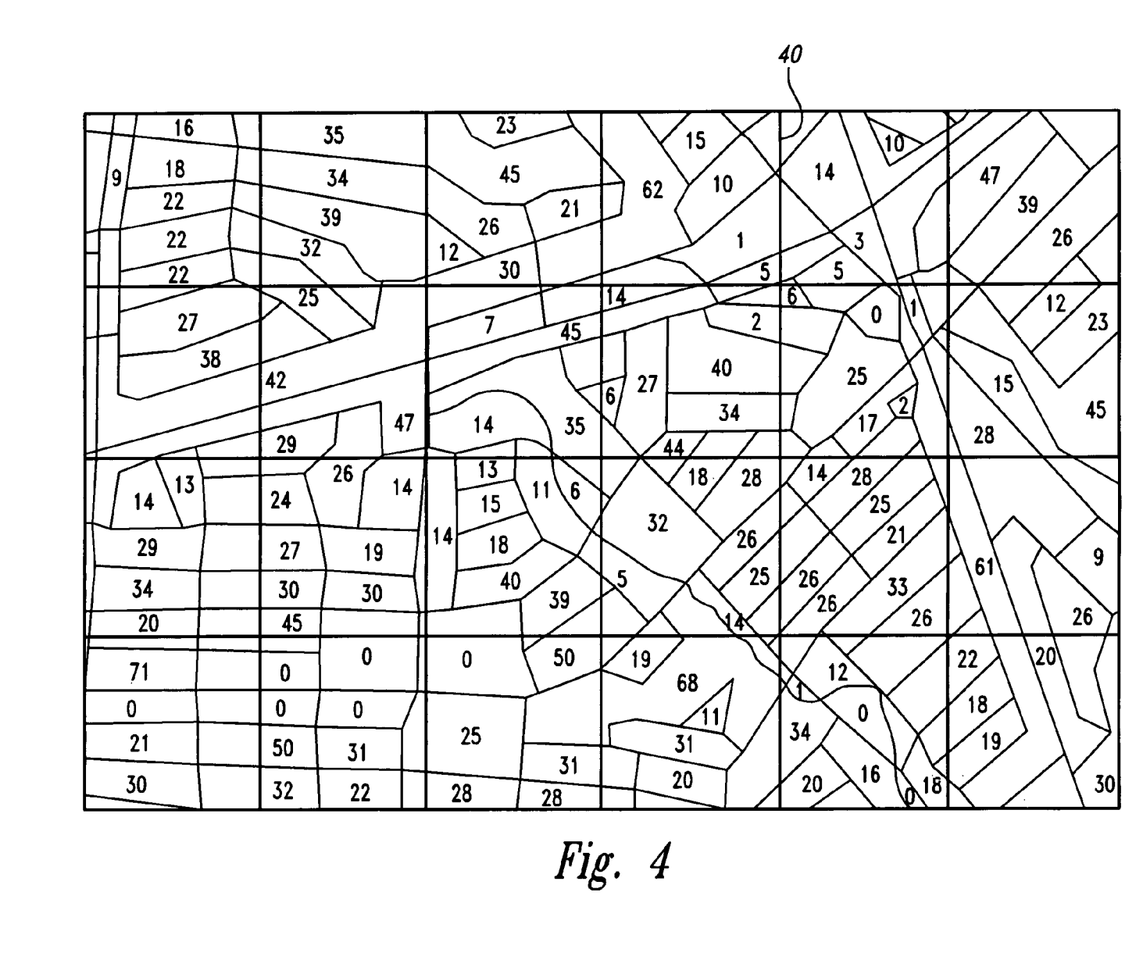
FIG. 4 illustrates a digital map divided into bins. The digital map shows the number of residences on each block.
Figure 5:
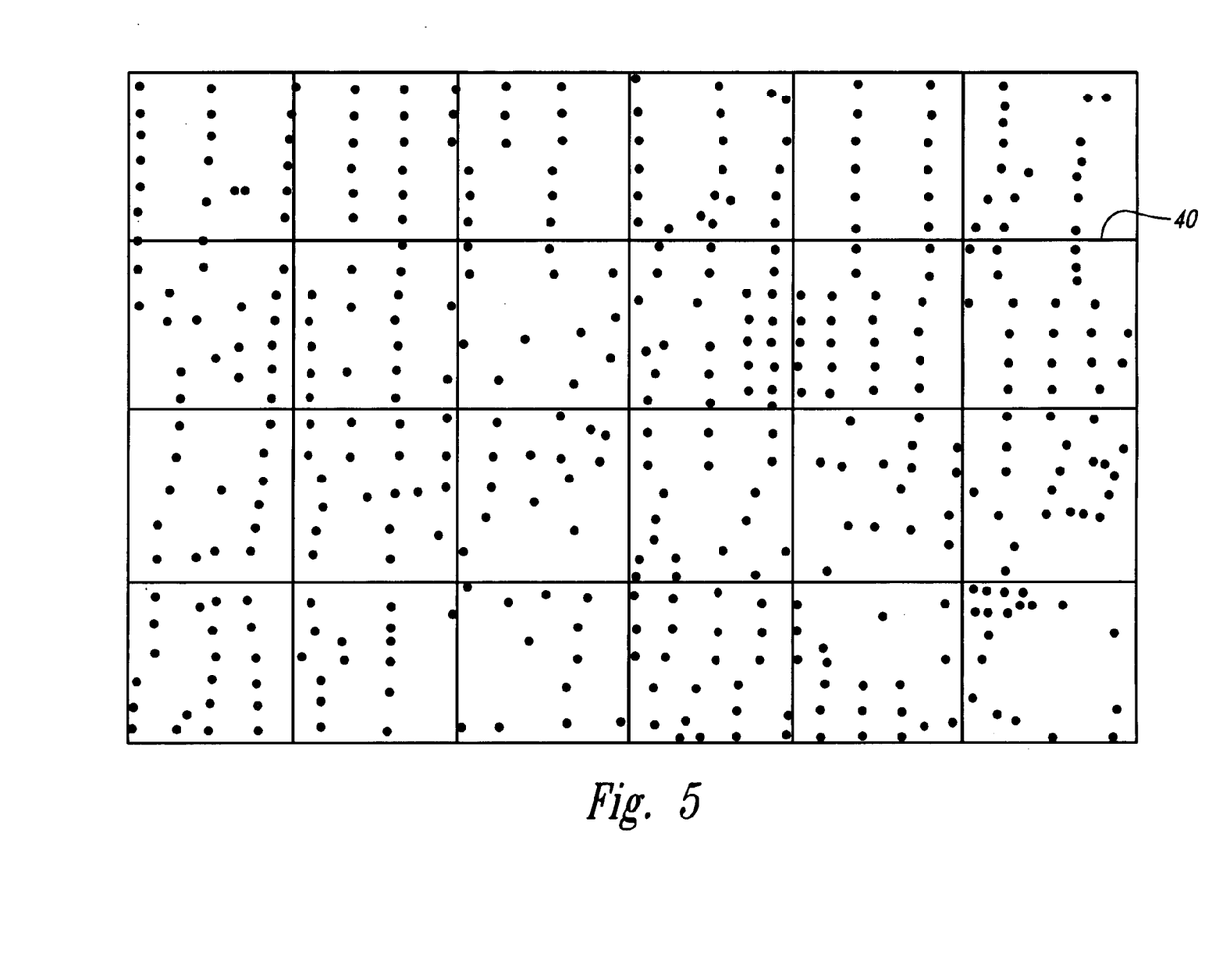
FIG. 5 illustrates a digital map divided into bins. The digital map shows the relative locations of homes in a particular area.

The memory 36 can include one or more digitized maps such as the maps illustrated in FIGS. 4 and 5. A grid 40 can be superpositioned over these maps to subdivide the map into bins. Each bin has a unique identity in the memory 36 and is associated with bin data. For instance, each bin can be associated with an approximate number of buildings positioned within the bin, an approximate growth rate for buildings within the bin, an approximate rate which the fixed loop wireless network has penetrated the bin and an approximate communication service load caused by each remote unit 16 within a bin. The growth rate for buildings within the bin describes the increase of the number of buildings within the bin over a specified unit of time.

FIG. 4 is a digital map which can be used to approximate building number data. The map is a U.S. census map showing the number of dwellings positioned on each block of a street map. An approximate number of dwellings within a particular bin can be estimated by assuming the homes are evenly distributed throughout each block on the census map. FIG. 5 is another map which can be used to estimate building number data. In FIG. 5, each dot illustrates the location of a building in a geographic area. The approximate number of buildings within a bin can be determined simply by summing up the number of dots within a bin. Such maps as those found in FIGS. 4 and 5 can be used when applying the invention towards the design of a fixed wireless loop network. If the fixed wireless loop network is already operational, maps like FIG. 5 can also be used; however, the points in FIG. 5 would represent the remote units 16 of existing customers and/or buildings that did not yet have remote units.

Approximate growth rate data can be determined by extrapolating from census data. Approximate penetration rates of the fixed loop wireless network into a bin can be determined by internally monitoring the market penetration of the fixed wireless loop network 10. These penetration rates can be projected to a future date by extrapolating from data about past penetration rates.

The degree of communication service load is commonly measure in terms of Erlangs. When operating a fixed wireless loop network 10 the communication service load can be approximated for a particular bin by averaging the communication service load of users which are already within an area encompassed by the bin. A suitable value to use for each user is the average communication service load created by that remote unit during the busiest hour of the day. The approximate communication service load can be vastly different for different bins since some bins will includes industry and business while other bins will be limited to residential homes. When designing a fixed wireless loop network 10 the communication service load for all bins comprising the design can be estimated using data such as that found in FIGS. 4 and 5, approximate penetration rates of the fixed loop wireless network, approximate growth rate data, and estimates of a typical customer's communication service load.

Figure 6A:
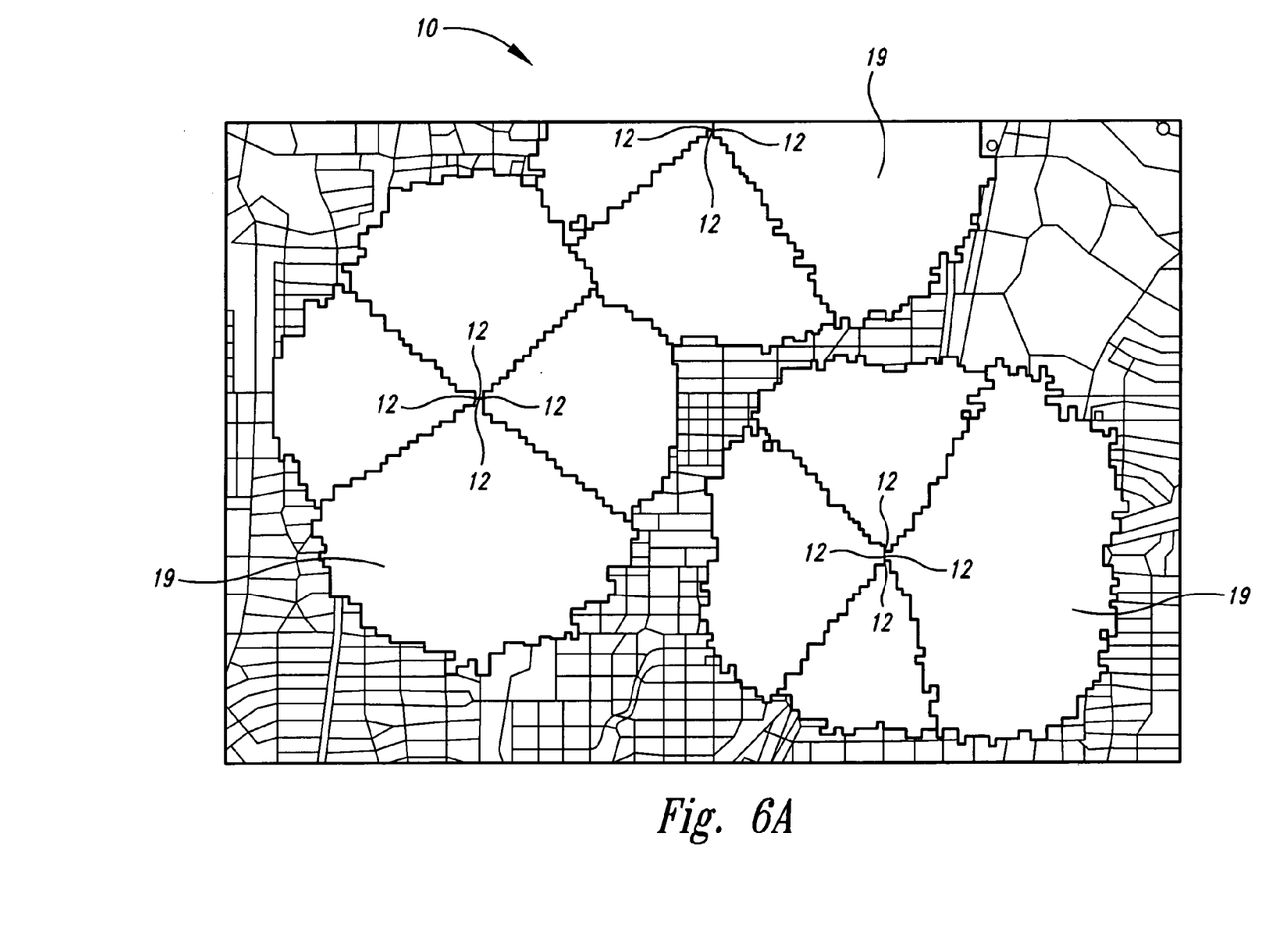
FIG. 6A is a service area plot.

FIG. 6A is an example of a service area plot including several stations 12 positioned on a digital map. The bins to which each station 12 is assigned to provide communication service are grouped together in a service area 19. Accordingly, each station 12 is associated with a particular service area 19.

A best server plot is a particular type of service area plot which can be used with the present invention. A best server plot assigns each bin to the station that provides the strongest signal strength to the bin. Best server plots are developed by predicting the propagation of radio waves over terrain and obstacles on the terrain. to estimate the signal strength of a station 12 within bins. Most radiowave propagation prediction tools provide an option which allows users to create best server plots. A suitable radiowave propagation prediction tool is Decibel Planner produced by Northwood Geoscience Ltd in Ottawa, Canada.

A best interference plot is another type of service area plot which can be used with the present invention. A best interference plot assigns each bin to the station that provides the strongest Carrier to Interference ratio, C/I, or Carrier to Adjacent channel interference ratio, C/A, developed by predicting the propagation of radio waves over terrain and obstacles on the terrain to estimate the signal strength of a station 12 within bins and then comparing the signal strengths to each other. The signal strengths are compared to each other in the following manner: Identify all stations 12 that meet the signal strength threshold in the bin. Choose the first station. For a best interferer plot based on C/I, identify all stations that use the same channel or channels as the station of interest. For a best interferer plot based on C/A, identify all stations that use the adjacent channel or channels as the station of interest. The C/I or C/A can be developed using equation 1:

$$C/I = RSSI_C - 10 \times LOG_{10}\left(\sum_{1}^{n} 10^{RSSI_n/10}\right) \quad \text{Equation 1}$$

where $RSSI_C$ is the signal strength of the station of interest and $RSSI_n$ is the signal strength of the $n^{th}$ interferer. Repeat the calculation for each station that meets the minimum signal strength in the bin. Choose the station that has the highest C/I or C/A for the bin. Repeat the process for all bins.

Each station 12 has a particular communication service load capacity. Specifically, enough remote units 16 can be assigned to a station 12 to create a communication service load that exceeds the communication service load capacity of the station 12. Once the communication service load on a particular station 12 is exceeded, the quality of communication service provided to the remote units 16 begins to degrade. As a result, the present invention accounts for the level of communication service load to be placed on a station 12 when selecting which remote units 16 will be assigned to a station 12.

When operating a fixed wireless loop network, the current communication service load on a particular station 12 can be approximated by summing up the communication service load created by each remote unit 16 to which the station 12 provides communication service. Since the communication service load created by a remote unit 16 varies with time, the communication service loads should be sampled at approximately the same time in order to increase accuracy. Below, the communication service load will be compared to load criteria to determine whether the station 12 is overloaded. Accordingly, the communication service load on a station 12 is preferably determined/estimated for the time when the communication service load is busiest, i.e. at peak times.

As an alternative to summing up communication service loads from individual remote units 16, the communication service load can be approximated by summing up the communication service load of each bin assigned to the station 12. The communication service load for a particular bin, L, can be approximated from the bin data stored in the memory 36. The bin data is then used in Equation 1 where $N_b$ is the approximate number of remote units 16 positioned within the bin, P is the approximate rate which the fixed loop wireless network has penetrated the bin, $L_{RU}$ is the approximate communication service load caused by each remote unit 16 within a bin and L is the communication service load on the bin. Further, a future communication service load can be approximated for a future date by using Equation 1 with P estimated for the future date and multiplied by the approximate growth rate for buildings within the bin, G.

$$L=(N_b)(P)(L_{RU}) \quad \text{Equation 2}$$

Load criteria can include a determination be applied to a test station 12 to determine whether the degree of communication service load on the test station 12 is acceptable. Application of the load criteria can include a determination whether the communication service load exceeds a threshold such as the communication service load capacity of the station 12. Another suitable threshold is 90% of the communication service load capacity of the station 12. The threshold criteria can also be a function of other stations 12 within the fixed wireless loop network 10. For instance, the threshold can be 110% of the average communication service load of the stations 12 having service areas 19 which overlap with the service area 19 of the test station 12. The threshold can also be the average communication service load on these stations 12 plus the standard deviation of these communication service loads.

Figure 6B:
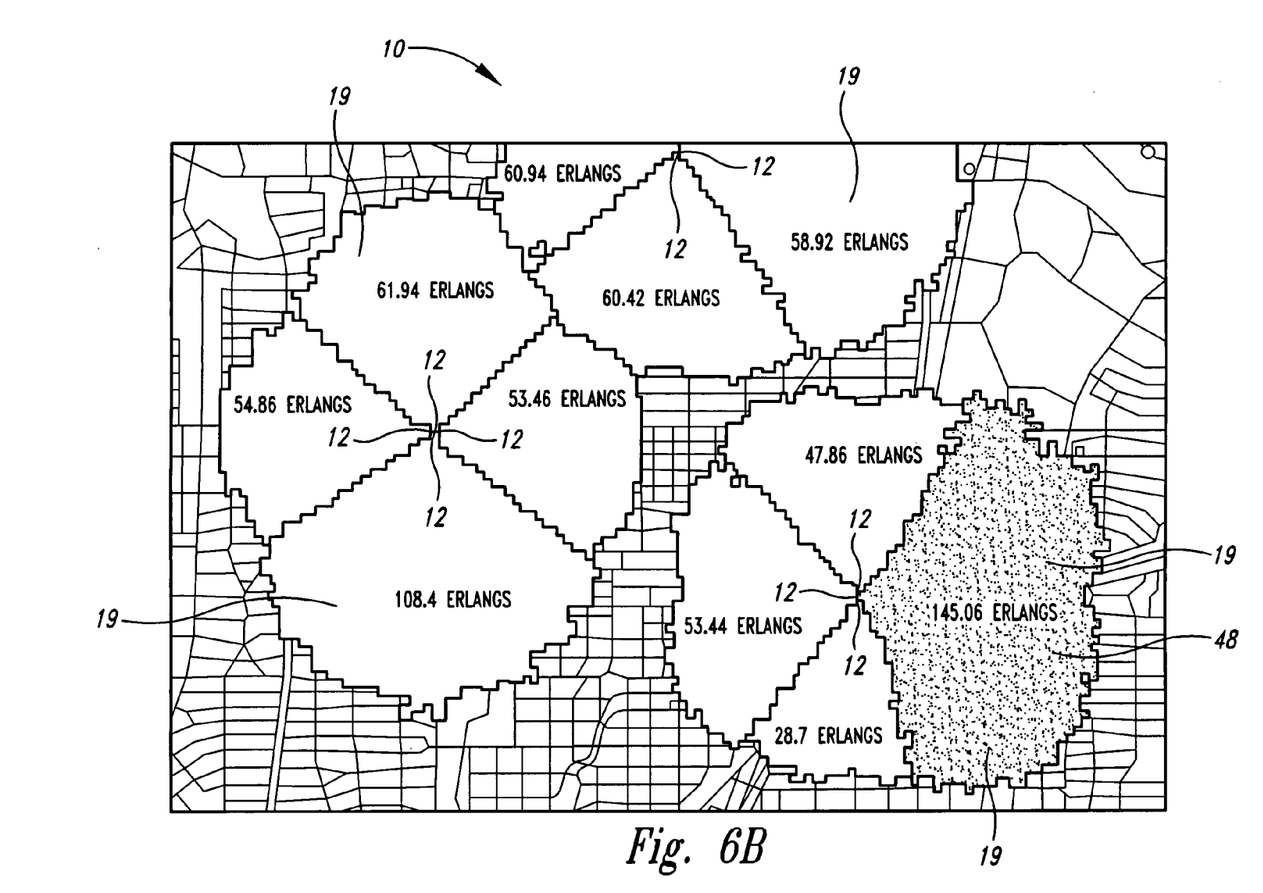
FIG. 6B illustrates the communication service loads for each of the service areas illustrated in FIG. 6A.

FIG. 6B illustrates hypothetical communication service loads on the stations 12 illustrated in FIG. 6A. The communication service load capacity for each of these stations 12 is 100 Erlangs. A hypothetical load criterion for these stations is whether the communication service load on each station 12 exceeds the communication service load capacity of the station 12. Applying this load criterion to the service area 19 labeled 48 illustrates that the degree of communication load services on the station 12 associated with this service area 19 is undesirable. This station 12 is accordingly a potentially overloaded station 12.

An embodiment of the present invention seeks to reduce the communication service load on the potentially overloaded station 12. The reduction in the communication service load is preferably accomplished by identifying re-assignable bins within the service area 19 of the potentially overloaded station 12. The re-assignable bins receive communication service from the potentially overloaded station but which can receive communication service from another station called a substitute stations 12. Accordingly, the re-assignable bins are positioned within an overlapping region such as the overlapping region illustrated in FIG. 2.

Re-assignment criteria are applied to the identified re-assignment bins to determine whether the substitute station 12 is suitable for providing communication service to the re-assignable bin. If the substitute station is suitable, the re-assignable remote unit 16 is re-assigned to the substitute station 12. Specifically, the substitute station 12 is to provide the communication service to the re-assigned remote unit 16. This process is repeated until the potentially overloaded station 12 falls out of the overloaded status or all the bins within the service area 19 of the potentially overloaded station 12 are exhausted.

Figure 6C:
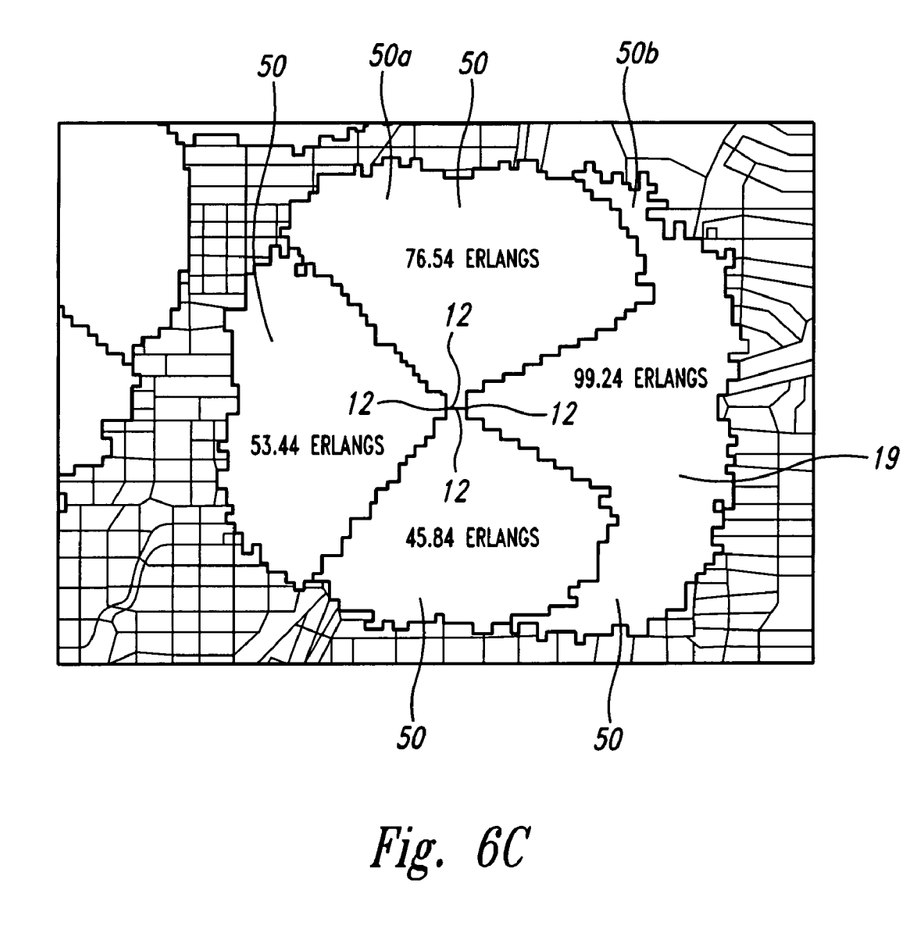
FIG. 6C illustrates a corrected service area plot.

Once the communication service load on the station 12 is reduced, a corrected best server plot can be created as illustrated in FIG. 6C. Each station 12 in the corrected best server plot is associated with a corrected service area 50. The corrected service area includes each of the bins to which the station 12 is to provide communication service. As a result, each corrected service area can include additional bins that have been re-assigned into the service area 19. Accordingly, the corrected service area labeled 50A is larger in FIG. 6C than it was in FIG. 6B. Additionally, bins can be re-assigned out of each service area 19. Accordingly, the corrected service area labeled 50B is smaller than it was in FIG. 6B. FIG. 6C also shows the corrected communication service load for each station 12. The corrected communication service load for the potentially overloaded station 12 of FIG. 6B is now 99.34 Erlangs where it was 145.06 Erlangs in FIG. 6B. As a result, applying the load criterion to this station 12 would indicate that the communication service load on this station 12 is acceptable.

Figure 7:
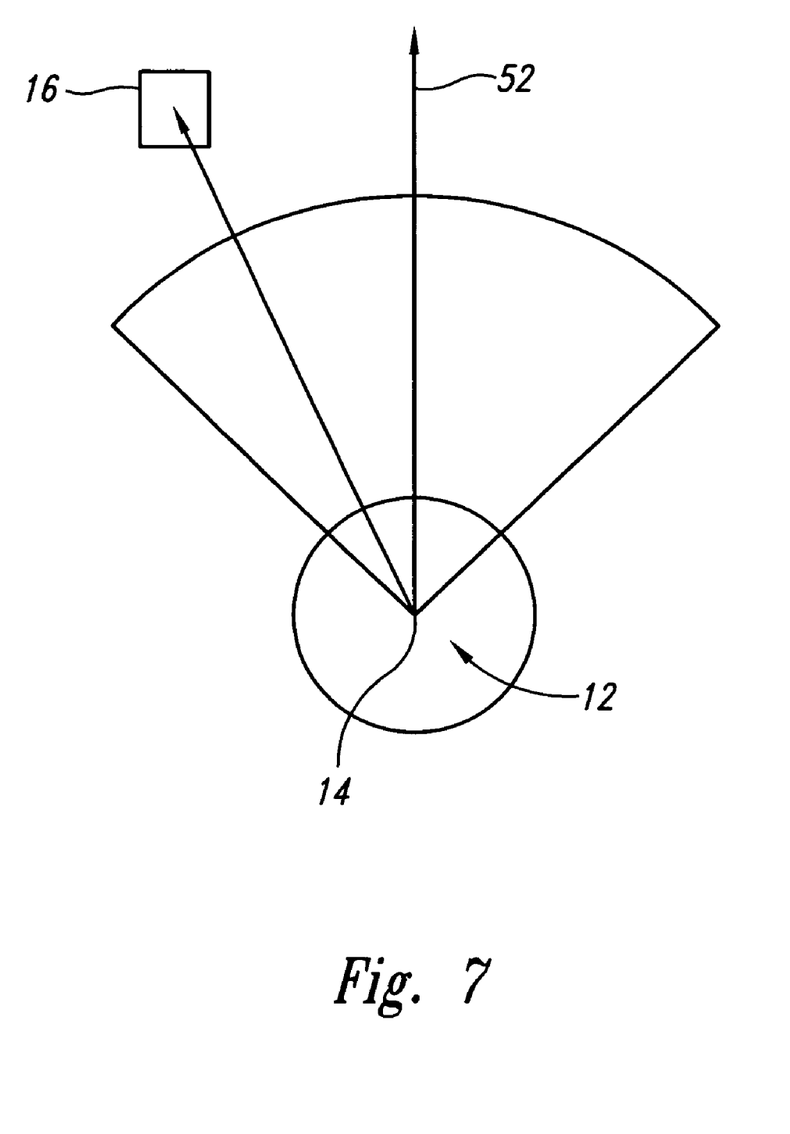
FIG. 7 illustrates the azimuthal angle associated with a directional antenna.

As described above, the re-assignable bins within an overloaded service area 19 are the bins that can satisfactorily receive communication service from a station 12 other than the potentially overloaded station 12. The re-assignable bins are sequentially identified starting at the periphery of the overloaded service area 19 where the signal strength is weakest and moving toward portions of the service area 19 having stronger signal strengths. For instance, when the station 12 includes an omnidirectional antenna 14, the first bin to be examined is the bin located furthest from the antenna 14. Additional bins are identified by proceeding inward toward the antenna 14. When the station 12 includes a directional antenna 14, the first bin to be examined is the bins located furthest from the azimuthal vector 52. As illustrated in FIG. 7, the azimuthal vector 52 is the vector extending from the antenna 14 through the center of the potential service area 18. Additional bins to be examined are identified by progressing toward the azimuthal vector 52.

Re-assignment criteria are applied to the identified re-assignable bin to determine whether the re-assignable bin can be re-assigned to a substitute station 12. The re-assignment criteria can be a function of the substitute station signal strength. For instance, the assignment criteria can include a determination whether the signal strength from the substitute station is above a signal strength threshold. A suitable signal strength threshold may be 90% of the signal strength provided by the potentially overloaded station 12. If the signal strength from the test station were found to be greater than 90% of the signal strength from the overloaded station, the re-assignable remote unit 16 would be re-assigned.

The re-assignment criteria can also be a function of the communication service load on the substitute station 12. For instance, the re-assignment criteria can include a determination whether the substitute station 12 is already a potentially overloaded station 12. If the determination were positive, the re-assignable remote unit 16 would not be re-assigned. Similarly, the re-assignment criteria can include a determination whether assigning the remote unit 16 to the substitute station would place the substitute station in an overload condition or would create an undesirable degree of communication service load on the substitute station 12. The re-assignable remote unit 16 would not be re-assigned under either of these conditions. The re-assignment criteria can also include determinations that are directed towards any radio interference in the bin to be re-assigned. For instance, the substitute station 12 can be required to meet an interference threshold, commonly called C/I (Carrier to Interference ratio) for co-channel interference and C/A (Carrier to Adjacent channel interference ratio), in the bin. The re-assignment criteria can also include determinations that are directed toward any or all of the signal strength, the communication service load of the substitute station, and the interference criterion in the bin. For instance, applying a preferred re-assignment criteria can include a determination of whether the signal strength from the substitute station is above a signal strength threshold followed by a determination of whether re-assigning the re-assignable remote unit 16 to the substitute station 12 would cause the substitute station 12 to become overloaded. If the signal strength of the substitute station is not sufficient or if the substitute station would become overloaded, the re-assignable remote unit 16 is not re-assigned to the substitute station 12

A re-assignable remote unit 16 that passes the re-assignment criteria is re-assigned to the substitute station 12. The substitute station 12 is then to provide communication service to the re-assigned remote unit 16.

Figure 8:
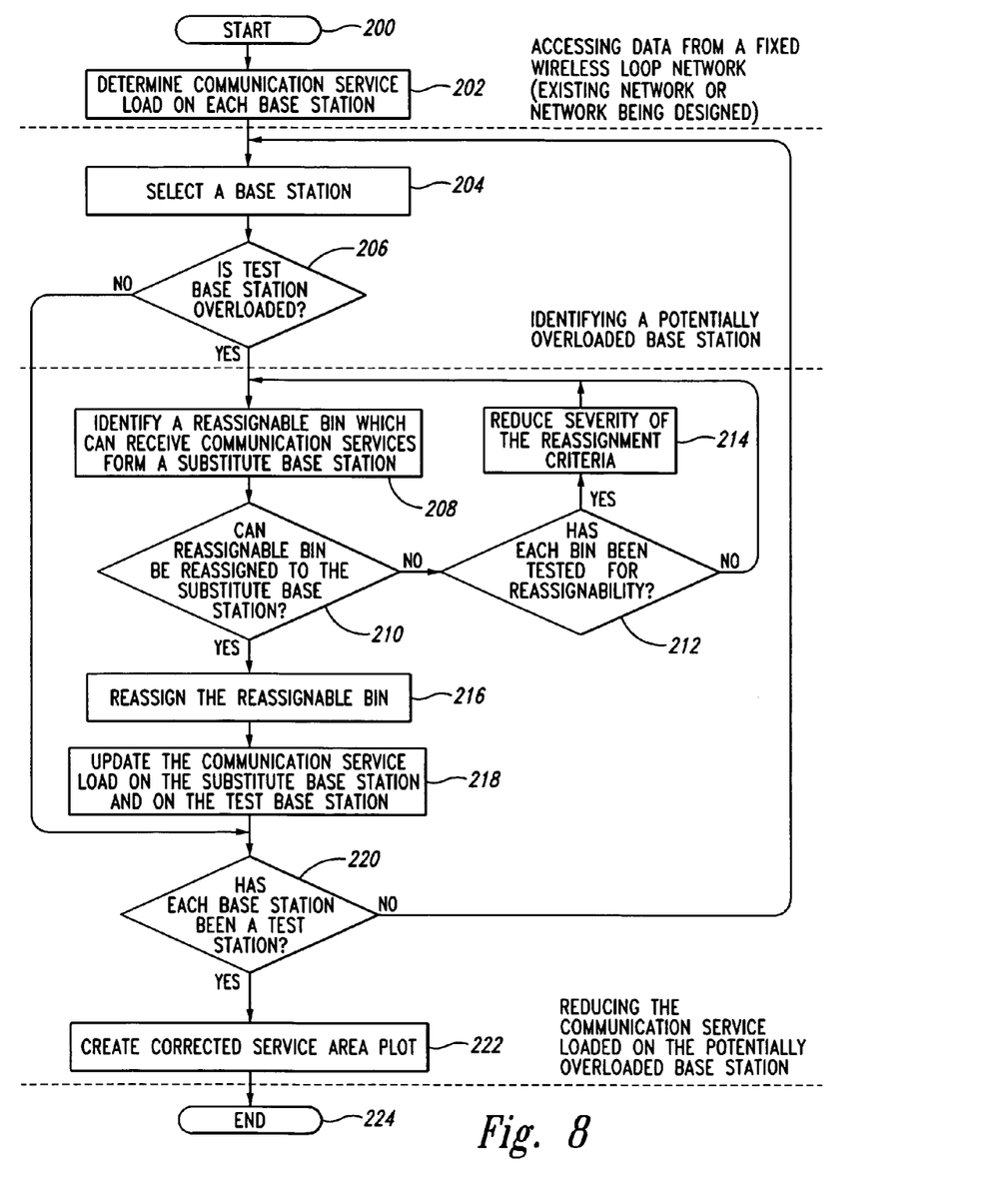
FIG. 8 is a process flow for a method of allocating resources in a fixed wireless loop network.

FIG. 8 is a process flow illustrating a method of allocating resources in a fixed wireless loop network 10. The method includes comparing communication service load data from one or more stations 12 to a communications load criterion to identify a potentially overloaded station 12. The number of remote units 16 receiving communication service from the potentially overloaded station 12 is then reduced. This reduction occurs by re-assigning remote units 16 from the potentially overloaded station 12 to substitute stations 12. A preferred method for re-assigning the remote units 16 is to re-assign the bins being serviced by the potentially overloaded station 12.

The process begins at start block 200 where input is received from a user interface or retrieved from the memory 36. Input that can be received from the user interface includes plurality of a service area plot. The selected service area plot can be a service area plot stored in the memory 36 such as a previously developed corrected service area plot or a best server plot. The selected plot is accessed from the memory 36 along with the bin data associated with each bin on the selected plot.

At process block 202 the communication service load on each station 12 is determined. At process block 204 a test station 12 is selected. At decision block 206 a determination is made whether the test station 12 is a potentially overloaded station 12. This determination is made by applying a load criterion to the station 12. As described above, a suitable load criterion is whether the communication service load on the station 12 exceeds the communication service load capacity of the station 12. When the determination at process block 206 indicates that the test station 12 is overloaded, a re-assignable remote unit 16 is identified at process block 208. The re-assignable remote unit 16 is a unit assigned to receive communication service from the test station 12 but which can receive these communication service from another station 12 called a substitute station 12.

At decision block 210, a determination is made whether the re-assignable remote unit 16 can be re-assigned to the substitute station 12. The determination is made by applying re-assignment criteria to the re-assignable remote unit 16. As described above, an example of a suitable re-assignment criterion includes a determination whether re-assigning the re-assignable remote unit 16 to the substitute station 12 will cause the substitute station 12 to become overloaded. When it is determined that the re-assignable remote unit 16 can not be re-assigned decision block 212 is accessed. At process block 212, the process is returned to process block 208 until each bin in the service area 19 of the test station 12 has been tested for re-assignability. Once each bin has been tested for re-assignability, the stringency of the re-assignment criteria is reduced at process block 224 and the process is returned to process block 208. Reducing the stringency of the re-assignment criteria can increase the number of bins that can be re-assigned. As an alternative to reducing the stringency of the re-assignment criteria, end block 234 can be accessed and the user can be provided with an alert.

When it is determined that the re-assignable remote unit 16 can be re-assigned, the re-assignable bin is re-assigned to the substitute station 12 at process block 216. As a result, the substitute station 12 is to provide communication service to the re-assignable remote unit 16. At process block 218, the communication service load on the test station 12 and on the substitute station 12 are updated to account for the changed communication service loads resulting from re-assignment of the re-assignable bin.

At decision block 210 the process is returned to process block 204 until each of the stations 12 has served as a test station. At process block 222, a corrected service area plot can optionally be created. The process terminates at end block 224 where the corrected service area plot and the associated in data are stored in the memory 36 where it can be accessed in the future.

The process flow illustrated in FIG. 8 is for illustrative purposes only and many variations are possible. For instance, the communication service load does not need to be determined for each station 12 as shown in process block 302 but can be determined as required. For instance, the communication service load can be determined for a test station 12 after the test station 12 has been selected at process block 204. Similarly, if the communication service load of the substitute station is required as part of the re-assignment criteria, the communication service load can be determined at decision block 210. Further, the user can select the stations that are to serve as test stations. As a result, the communication service load will only be determined for a portion of the stations on the service area plot.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A method of allocating resources in a network, comprising:
    accessing data from a fixed wireless loop network having a plurality of stations which are each associated with a plurality of remote units, at least a portion of the plurality of remote units being capable of receiving communication services from more than one of the plurality of stations, but assigned to receive communication service from the associated station;
    comparing communication service load data associated with one or more stations to a communication load criteria to identify a potentially overloaded station;
    identifying one of the plurality of remote units assigned to the potentially overloaded station as re-assignable to a substitute station;
    reassigning the identified remote unit to the substitute station to thereby reduce the number of remote units assigned to receive communication service from the potentially overloaded station; and
    repeating the identifying and reassigning of remote units until the potentially overloaded station is no longer in an overloaded status.

2. The method of claim 1, wherein the fixed wireless loop network is a hypothetical network.

3. The method of claim 1, wherein the data from the fixed wireless loop network includes data from a service area plot.

4. The method of claim 3, wherein the service area plot is a service area plot for a hypothetical network.

5. The method of claim 3, wherein the service area plot is a corrected service area plot.

6. The method of claim 3, wherein the service area plot is a best server plot.

7. The method of claim 3, wherein the service area plot is a best interference plot.

8. The method of claim 3, wherein the service area plot is divided into bins.

9. The method of claim 1, wherein the communication service load data includes a level of communication service load projected for a future date.

10. The method of claim 1, wherein the communication service load data includes an approximate level of communication service for a peak usage time.

11. The method of claim 1, wherein comparing communication service load data from one or more stations to communications load criteria includes comparing the communication service load data to a communication service load threshold.

12. The method of claim 8, wherein the communication service load threshold is the communication service capacity of the potentially overloaded station.

13. The method of claim 1, wherein reducing the number of remote units receiving communication service from the potentially overloaded station includes applying re-assignment criteria to the re-assignable remote unit to determine whether the re-assignable remote unit can be re-assigned to the substitute station.

14. The method of claim 13, wherein applying the reassignment criteria includes determining whether re-assigning the re-assignable remote unit to the substitute station would cause the substitute station to become a potentially overloaded station.

15. The method of claim 13, wherein applying the reassignment criteria includes comparing a strength of a signal from the substitute station against a signal strength threshold.

16. The method of claim 13, wherein applying the reassignment criteria includes comparing the strength of an interference signal experienced by the substitute station to an interference threshold.

17. The method of claim 13, wherein applying the reassignment criteria includes comparing a strength of a signal from the substitute station against a signal strength threshold and determining whether re-assigning the re-assignable remote unit to the substitute station would cause the substitute station to become a potentially overloaded station.

18. The method of claim 13, wherein applying the reassignment criteria includes comparing a strength of a signal from the substitute station against a signal strength threshold and comparing the strength of an interference signal experienced by the substitute station to an interference threshold.

19. The method of claim 13, wherein applying the reassignment criteria includes determining whether re-assigning the re-assignable remote unit to the substitute station would cause the substitute station to become a potentially overloaded station and comparing the strength of an interference signal experienced by the substitute station to an interference threshold.

20. The method of claim 13, wherein applying the reassignment criteria includes determining whether re-assigning the re-assignable remote unit to the substitute station would cause the substitute station to become a potentially overloaded station, comparing the strength of an interference signal experienced by the substitute station to an interference threshold, and comparing a strength of a signal from the substitute station against a signal strength threshold.

21. The method of claim 1, further comprising:
creating a service area plot which accounts for remote units re-assigned from one station to a substitute station.

22. A computer-readable medium including machine readable instructions executable by a processing apparatus operationally coupled to a communication network to perform a method of assigning remote units in the communication network, the method comprising:
accessing data from a fixed wireless loop network having a plurality of stations which are each associated with a plurality of remote units, at least a portion of the plurality of remote units being capable of communicating with the associated station and a substitute station, but assigned to receive communication service from the associated station;
comparing communication service load data associated with one or more stations to a communications load criteria to identify a potentially overloaded station;
identifying one of the portion of remote units as re-assignable to the substitute station;
reassigning the identified remote unit to the substitute station to thereby reduce the number of remote units assigned to receive communication service from the potentially overloaded station; and
repeating the identifying and reassigning of remote units until the potentially overloaded station is no longer in an overloaded status.

23. The medium of claim 22, wherein the fixed wireless loop network is a hypothetical network.

24. The medium of claim 22, wherein the data from the fixed wireless loop network includes data from a service area plot.

25. The medium of claim 24, wherein the service area plot is a service area plot for a hypothetical network.

26. The medium of claim 24, wherein the service area plot is a corrected service area plot.

27. The medium of claim 24, wherein the service area plot is a best server plot.

28. The medium of claim 24, wherein the service area plot is a best interference plot.

29. The medium of claim 24, wherein the service area plot is divided into bins.

30. The medium of claim 22, wherein the communication service load data includes a level of communication service load projected for a future date.

31. The medium of claim 22, wherein the communication service load data includes an approximate level of communication service for a peak usage time.

32. The medium of claim 22, wherein comparing communication service load data from one or more stations to a communications load criteria includes comparing the communication service load data to a communication service load threshold.

33. The medium of claim 32, wherein the communication service load threshold is the communication service capacity of the potentially overloaded station.

34. The medium of claim 22, wherein reducing the number of remote units receiving communication service from the potentially overloaded station includes applying a re-assignment criteria to the re-assignable remote unit to determine whether the re-assignable remote unit can be re-assigned to the substitute station.

35. The medium of claim 34, wherein applying the reassignment criteria includes determining whether re-assigning the re-assignable remote unit to the substitute station would cause the substitute station to become a potentially overloaded station.

36. The medium of claim 34, wherein applying the reassignment criteria includes comparing a strength of a signal from the substitute station against a signal strength threshold.

37. The medium of claim 34, wherein applying the reassignment criteria includes comparing the strength of an interference signal experienced by the substitute station to an interference threshold.

38. The medium of claim 34, wherein applying the reassignment criteria includes comparing a strength of a signal from the substitute station against a signal strength threshold and determining whether re-assigning the re-assignable remote unit to the substitute station would cause the station to become a potentially overloaded station.

39. The medium of claim 34, wherein applying the reassignment criteria includes comparing a strength of a signal from the substitute station against a signal strength threshold and comparing the strength of an interference signal experienced by the substitute station to an interference threshold.

40. The medium of claim 34, wherein applying the reassignment criteria includes determining whether re-assigning the re-assignable remote unit to the substitute station would cause the substitute station to become a potentially overloaded station and comparing the strength of an interference signal experienced by the substitute station to an interference threshold.

41. The medium of claim 34, wherein applying the reassignment criteria includes determining whether re-assigning the re-assignable remote unit to the substitute station would cause the substitute station to become a potentially overloaded station, comparing the strength of an interference signal experienced by the substitute station to an interference threshold, and comparing a strength of a signal from the substitute station against a signal strength threshold.

42. The medium of claim 22, wherein the method further comprises:
creating a service area plot which accounts for remote units reassigned from one station to a substitute station.

* * * * *